United States Patent [19]

Ditto

[11] 4,076,788
[45] Feb. 28, 1978

[54] MOLD COATING OF FRESHLY MOLDED ARTICLES

[75] Inventor: Edwin D. Ditto, Bloomfield Hills, Mich.

[73] Assignee: General Motors Corporation, Detroit, Mich.

[21] Appl. No.: 746,865

[22] Filed: Dec. 2, 1976

[51] Int. Cl.² .......................... B29D 9/00; B29F 1/10
[52] U.S. Cl. .................................. 264/255; 264/246; 264/255; 264/279; 264/325
[58] Field of Search ............... 264/265, 266, 279, 294, 264/325, 244, 246, 257, 255

[56] References Cited

U.S. PATENT DOCUMENTS

| | | | |
|---|---|---|---|
| 3,026,573 | 3/1962 | Ciaio | 264/265 X |
| 3,028,284 | 4/1962 | Reeves | 264/294 X |
| 3,077,658 | 2/1963 | Wharton | 264/265 X |
| 3,087,201 | 4/1963 | Williams | 264/266 X |
| 3,184,527 | 5/1965 | Fischer | 264/255 |
| 3,319,301 | 5/1967 | Ludwig | 264/244 X |
| 3,507,730 | 4/1970 | Gambill | 264/266 X |
| 3,670,066 | 6/1972 | Valyi | 264/325 X |
| 3,694,541 | 9/1972 | Gelin | 264/325 X |
| 3,709,973 | 1/1973 | Maltby | 264/244 |
| 4,012,386 | 3/1977 | Davis | 264/325 X |

FOREIGN PATENT DOCUMENTS 2,444,267  3/1975  Germany ........................... 264/266

Primary Examiner—Richard R. Kucia
Attorney, Agent, or Firm—Lawrence B. Plant

[57] ABSTRACT

A method of compression molding a special purpose coating or skin onto the surface of a freshly molded polymeric substrate, including the steps of: injecting a skin-forming material between the surface to be coated and the die forming that surface such that the substrate is hydraulically immobilized within the mold cavity during separation of the die from the substrate surface, and thereafter compression molding the skin-forming material over the surface.

2 Claims, 5 Drawing Figures

MOLD COATING OF FRESHLY MOLDED ARTICLES

BACKGROUND OF THE INVENTION

This invention relates to the matched metal die molding of composite articles, and more particularly to compression molding a special purpose (e.g., cosmetic, hard, abrasion-resistant, etc.) skin of one polymer onto a surface of another freshly-molded, compatible polymer. Such a technique has been found desirable, for example, in providing cosmetic (i.e., substantially blemish-free or colored) coatings to freshly-molded articles whose as-molded surfaces are aesthetically undesirable for reasons such as porosity resulting from uneven plastic flow, sink marks due to shrinkage occurring at joints and/or discolorations or blemishes due to impurities in the molding material and/or high filler loadings.

The process of improving the surface of compression molded articles by compression molding a cosmetic skin thereover to cover or fill any imperfections therein is well known in the art. Fischer U.S. Pat. No. 3,184,527, for example, discloses introducing a blob of skin-forming material into the mold after the base article has either fully or partially set-up (i.e., cured or solidified) followed by compression molding the blob over and to the surface being coated. Such processes, however, are unnecessarily time consuming, require unnecessary mechanical means to immobilize the first-molded article or substrate in place in the mold during complete opening thereof and are susceptible to the incursion of contaminants (e.g., flash, dirt, etc.) into the mold during opening and the placement of the blob in the mold.

It is an object of the present invention to provide an automatic, in-mold coating process for providing a freshly-molded polymeric substrate with a skin of desired properties in a simple, quick and accurate manner without dislodging the substrate in the mold or rendering it accessible to the contamination between molding and coating.

This and other objects of the invention will become more readily apparent from the detailed description which follows in which.

BRIEF STATEMENT OF THE INVENTION

Figure 1:
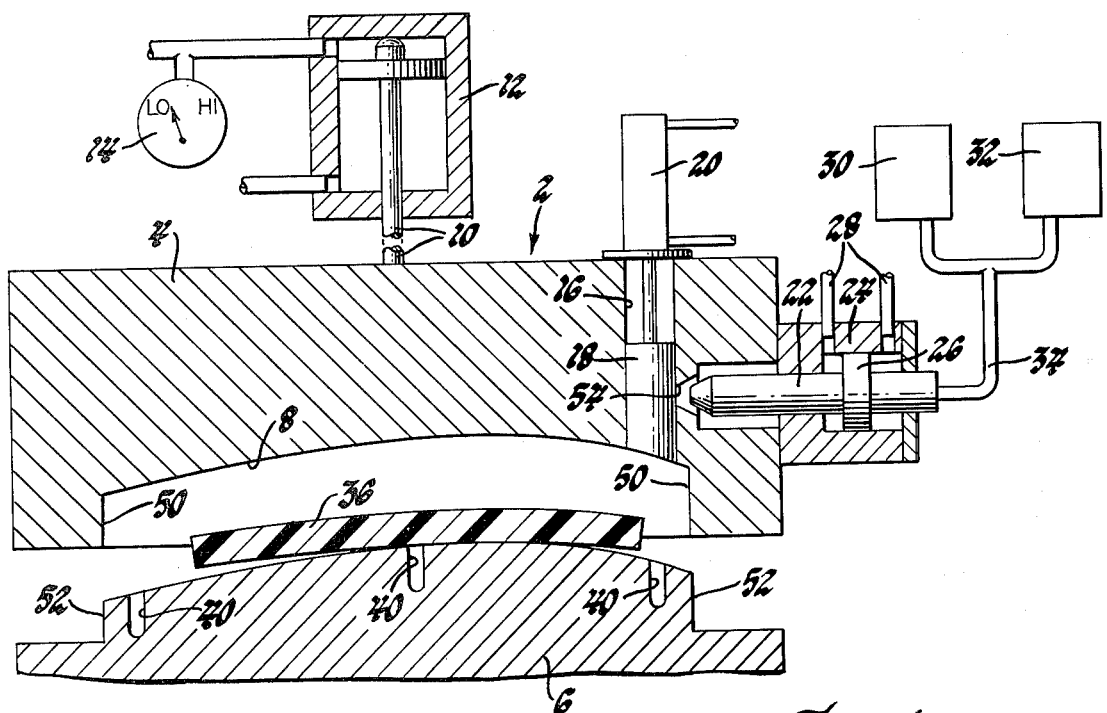
FIG. 1 illustrates a sectioned side view of an open mold and sheet molding compound (SMC) prior to molding.

This invention comprehends a method for in-mold coating of a freshly-molded polymeric substrate with a compatible, special purpose polymeric skin by: molding the substrate in a mold cavity between separable, nesting dies of a matched metal die molding set; allowing the substrate to set-up (i.e., cure or harden) in the mold cavity; injecting a skin-forming material between a surface of the substrate and its forming die in such a manner as to hydraulically immobilize the substrate in the mold against the surface-forming die's mate as the surface-forming die separates from the substrate in a partial opening of the mold which is insufficient to unnest the dies; reclosing and repressurizing the mold so as to distribute the injected skin-forming material substantially uniformly across the surface of the substrate; and allowing the respective moldings (i.e., substrate and skin) to set-up sufficiently to permit complete opening of the mold and removal of the coated article without deleteriously affecting the skin.

The present invention is particularly useful in coating compression molded fiber reinforced thermosetting resins, and primarily the polyester variety thereof which have come to be known in the art as "bulk molding" or "sheet molding" compounds. Such materials are described in numerous publications and patents including the annually published *Modern Plastics Encyclopedia* (e.g., 1974–1975), the *Encyclopedia of Chemical Technology*, Kirk-Othmer, 2d ed., Vol. 20, pp. 791–839, Interscience 1969, and Fischer 3,184,527. It is to be appreciated, however, that the process is seen to be useful with other compression and injection molded thermosets (e.g., the epoxies, phenolics, silicones, aminos, polyurethanes, etc.) and thermoplastics (e.g., polyethylene, ABC, PVC, polystrene, polypropylene, acrylics, etc.).

In accordance with the present invention, the article (i.e., the substrate) to be coated is first molded, according to conventional practice, in a cavity formed between nesting, separable dies of a matched metal die mold set. The term "nesting" as used herein is intended to mean a close-fitting telescoping of one die within the other to provide a polymer-containment seal around the mold cavity where the dies slip together. Such a seal is typically formed by some of the substrate polymer's flowing into the joint between the dies which prevents further escape of polymer from the cavity and forms a flash about the molding at the parting line. The thusly molded article or substrate is allowed to set-up (i.e., harden as by curing or solidifying) sufficiently to retain its shape during opening of the mold and injection of the skin-forming coating material. In this regard, thermosets need not be fully cured at this stage in the operation and final curing of the substrate can be accomplished coincidentally with the curing of the skin-forming coating.

When the substrate is sufficiently set-up to permit opening of the mold without deleteriously affecting the molded part, the ram pressure on the movable die is reduced, and a skin-forming resin injected between the surface-forming die and the substrate surface so as to hydraulically hold the substrate substantially immovably against the other cooperating member of the die set during opening. Preferably the skin-forming resin is injected against and substantially normal to the surface being coated to achieve maximum immobilization of the substrate especially near the injector. By the end of injection, the surface forming die is separated from the surface being coated by a gap which exceeds the thickness of the finished skin. In this regard, the dies separate sufficiently to receive all of the injected resin and distribute it about 50% over the surface to be coated, but not sufficiently to unnest the dies and disrupt the seal formed around the mold cavity. The degree of resin distribution during injection can vary significantly depending primarily on the viscosity of the injected material. In this regard, low viscosity materials are more readily distributed over larger areas with lower injection pressures than high viscosity materials. Maintenance of this seal during opening prevents loss of the skin-forming polymer from around the edges of the mold cavity, helps direct the flow of the skin-forming resin across the surface being coated during injection and causes a slight vacuum to be formed in the gap which facilitates the injection without the need for positively venting the mold cavity.

Following injection of the requisite predetermined amount of skin-forming resin, the rams(s) is (are) repressurized and the skin-forming resin spread over the remainder of the surface of the substrate. With knowledge of the surface area to be covered the amount of resin injected is predetermined to provide a skin of predetermined thickness. Thereafter, the temperature and pressure are maintained until the skin-forming resin sets-up sufficiently to permit opening of the dies and ejection of the coated substrate. During this time the substrate itself may finish curing in the event injection occurred before it had completely cured. In general it has been observed that injection may begin after the substrate has cured about 90% without deleteriously affecting the outcome.

In a preferred form of the invention, the substrate is molded, the ram(s) pressure on the movable die is reduced, and the surface forming die separated from the surface being coated substantially solely by the hydraulic pressure exerted against the die by the injected resin. Mechanical assists (e.g., hydraulic jacks) on the corners of the movable die may of course be used to supplement the lifting force of the injected resin. When mechanical assists are used, appropriate controls (not shown) are employed to synchronize the mold opening rate with the injection rate. In a most preferred form mold opening rate and die parallelism are controlled by appropriate means such as the Force/Velocity Control system described by Mr. Wm. Todd in his paper entitled "Control System Promises Advance Compression Molding Technology," Modern Plastics, June 1976, pp. 54–56.

FIGS. 1–5 depict the sequence of operations employed in carrying out the process of the present invention in conjunction with forming a cosmetic skin on the top surface of the substrate illustrated. The Figures show an open compression mold 2 comprising an upper movable die 4, a lower fixed die 6 adapted to nest/mate with the die 4, a mold cavity 8 between the dies 4–6 and a slab of sheet molding compound 36 (FIG. 1) between the dies 4–6. The dies 4 and 6 slidingly mate along surfaces 50 and 52 respectively when the dies nest in telescoping fashion in the closed (i.e., FIGS. 3 and 5) and semi-closed positions (i.e., FIG. 4). In the particular embodiment shown, the lower die 6 includes a plurality of grooves 40 which form part of the mold cavity 8 to provide ribs in the molded part.

The movable die 4 reciprocates relative to the fixed die 6 under the action of appropriate hydraulic or pneumatic actuator means 12 acting through ram 10 (i.e., only one shown). A gauge 14 is used in the drawings to illustrate the pressure condition of the actuator 12 at the several stages of the process.

A chamber 16 is provided in the movable die 4 for receiving a predetermined amount of skin forming resin from resin injector 22 through inlet port 54. A piston 18 reciprocates within the cylindrical chamber 16 to initially permit filling of the chamber 16 with skin-forming resin 46 and subsequently discharge same into the mold cavity 8 as will be discussed in more detail hereinafter. Appropriate hydraulic or pneumatic means 20 drives the piston 18. The drawings illustrate storage vessels 30 and 32 for providing the ingredients of a two component, thermosetting skin-forming resin system, but it is to be appreciated that single component resins which are compatible with and bondable to the substrate material are also useable with the process of the present invention. The resin system components from the vessels 30 and 32 are fed in requisite proportions through a conduit 34 and into a mixing injector 22 which homogenizes resin system components prior to injection through port 54 into chamber 16. The mixing injector 22 is cooled to prevent premature curing of the resin in the injector and accordingly is provided with positioner means 24 to move it back and forth into and out of engagement with the die 4 at different stages of the process in order to insure substantial temperature independence between the die 4 and the injector 22 throughout most of the sequence. The positioner 24 is illustrated as including an annular piston 26 circumscribing the injector 22 and acted upon by fluid pressure exerted there against incident to the pressurizing and depressurizing of the fluid in the inlet and outlet conduits 28 to effect the reciprocation of the injector 22.

Figure 2:
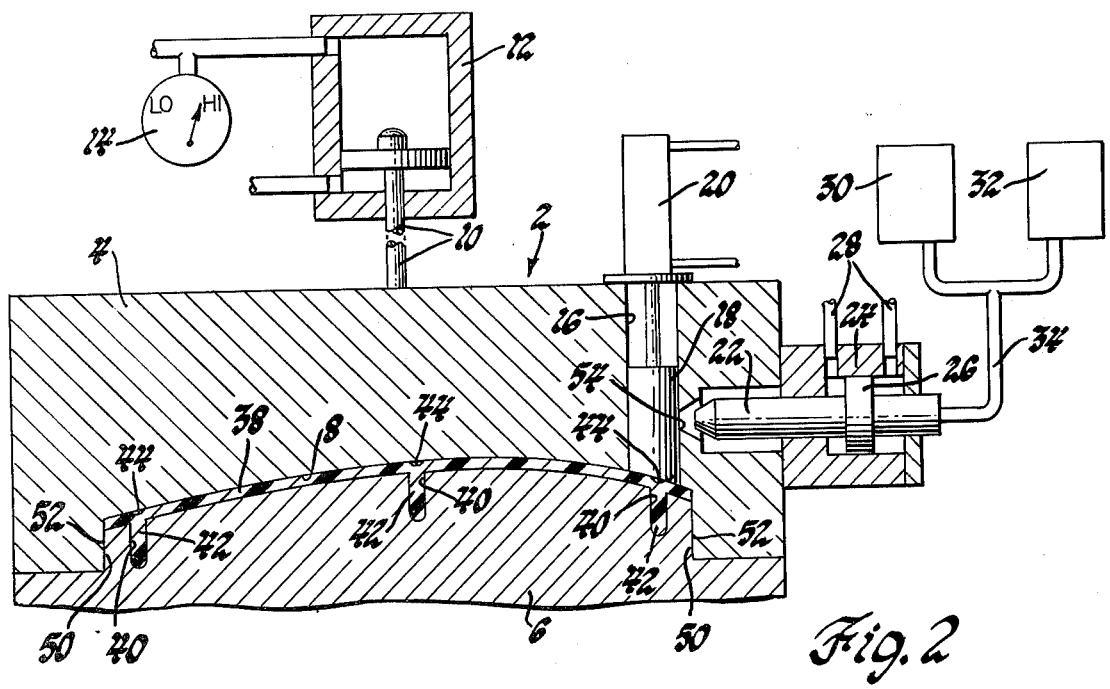
FIG. 2 is a sectioned side view of the mold of FIG. 1 during molding of the SMC.

FIG. 1 depicts the beginning of the process after a slab of sheet molding compound 36 (e.g., FRP sheet) has been inserted between the open dies 4–6 and atop the die 6. At this point the molds would already be preheated by appropriate means (not shown) to the requisite molding temperature which will depend on the material being molded and the cycle time available to molding. At this time the injector 22 is retracted, and the piston 18 is in the forward or discharge position sealing off the chamber 16 from the mold cavity 8 and port 54. After the slab 36 has been positioned in the open mold, the ram actuator 12 is pressurized driving the die 4 downwardly into telescoping engagement with the fixed die 6 as best shown in FIG. 2. The surfaces 50 and 52 of the dies slidingly seal the periphery of mold cavity 8 to prevent expulsion of the sheet molding compound 36 from the mold cavity except for the flash normally formed with such molds at such a junction. As the die 4 closes on the die 6, the slab 36 deforms and flows to fill the mold cavity 8 and rib forming grooves 40 in the formation of the ribbed (i.e., 42) substrate 38 which is later to be coated. Molding pressure is maintained on the die 4 until the substrate 38 cures and hardens enough to permit separation of the die 4 therefrom without deleteriously affecting the substrate 38. During curing sink marks 44 are normally formed due to shrinkage occurring where the ribs 42 join the main body of the substrate 38. The surface of the substrate may have other imperfections (e.g., flow marks, reinforcing fillers, etc.) as indicated earlier herein.

Figure 3:
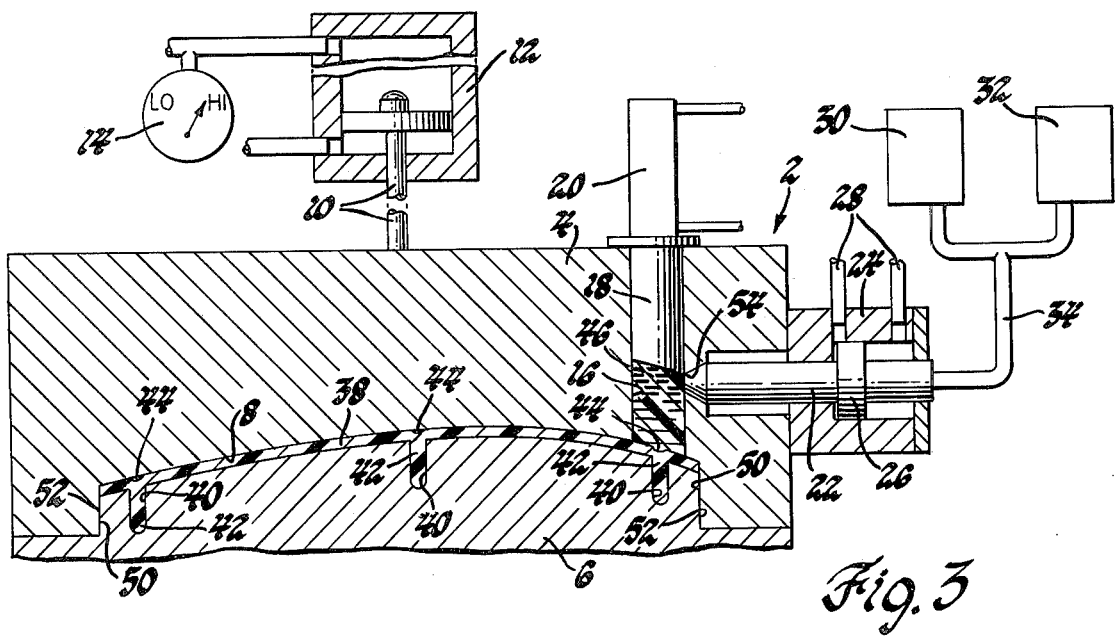
FIG. 3 is a sectioned side view of the mold of FIG. 1 following setting-up of the SMC, relaxation of the molding pressure and charging of the injector.

In order to obscure any of the defects, sink marks or other imperfections a cosmetic coating is applied to substrate's surface as follows (see FIGS. 3–5). During the final stages of curing of the substrate 38, the injector 22 is moved forward to engage the port 54 and the piston 18 retracted to open the chamber 16 to the injector 22 via port 54. Thereafter a predetermined amount of skin-forming resin 46 is injected into the chamber 16 substantially filling same as illustrated in FIG. 3. When the substrate has cured sufficiently (i.e., about 90% or more) to permit opening of the mold without deleteriously affecting the substrate 38, pressure on the ram actuator 12 is reduced (see gauge 14 — FIG. 4), and by means of piston 18, the skin-forming resin 46 injected between the substrate 38 and the movable die 4. After the piston 18 closes off the port 54, the injector 22 moves away from the port 54 so as to be thermally isolated from the die 4. The skin-forming resin is injected against the substrate 38 in a direction substantially normal to the surface being coated and exudes radially outwardly from the locus of injection and over the surface hydraulically pressing the substrate 38 tightly against the fixed die 6 and thereby preventing its dislodgement or unseating therefrom. At the same time, the movable die 4 opens sufficiently to accommodate all of the injected skin-forming resin 46 without completely distributing it across the surface of the substrate 38 (i.e., see FIG. 4). This causes a slight vacuum to be formed in the gap between the substrate 38 and the die 4 which not only facilitates the spreading of the resin 46 across the surface of the substrate 38 and into the sink marks 44 but obviates the need for venting the cavity 8 as would otherwise be required to permit complete filling of an air filled cavity 8.

Following injection of the skin-forming resin 46 (see FIG. 4) the ram actuator 12 is repressurized so as to drive the movable die 4 downwardly and compression mold (see FIG. 5) the skin-forming resin 46 across and to the upper surface of the substrate 38 — filling the sink marks 44 and covering imperfections thereon with the as-molded skin 48. The temperature and pressure of the mold is maintained until the skin-forming resin 46-48 cures sufficiently to permit opening of the mold without deleteriously affecting the skin (e.g., disrupt its outer surface and/or upset the bond between the skin and the substrate). Following mold opening the part is ejected therefrom.

Figure 4:
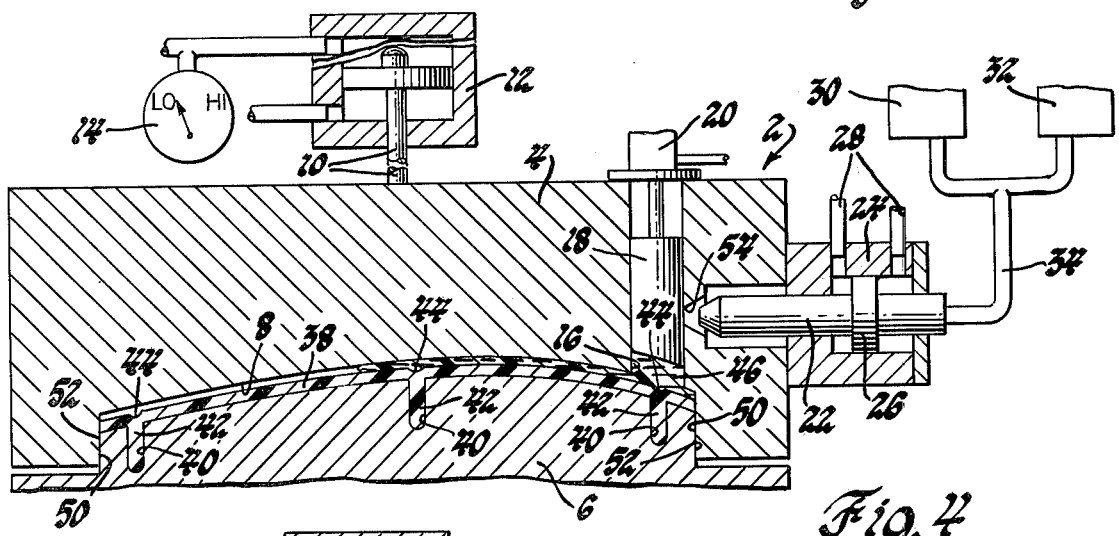
FIG. 4 is a sectioned side view of the mold of FIG. 1 during separation of the upper and lower dies and injection of the skin-forming material atop the molded SMC.
Figure 5:
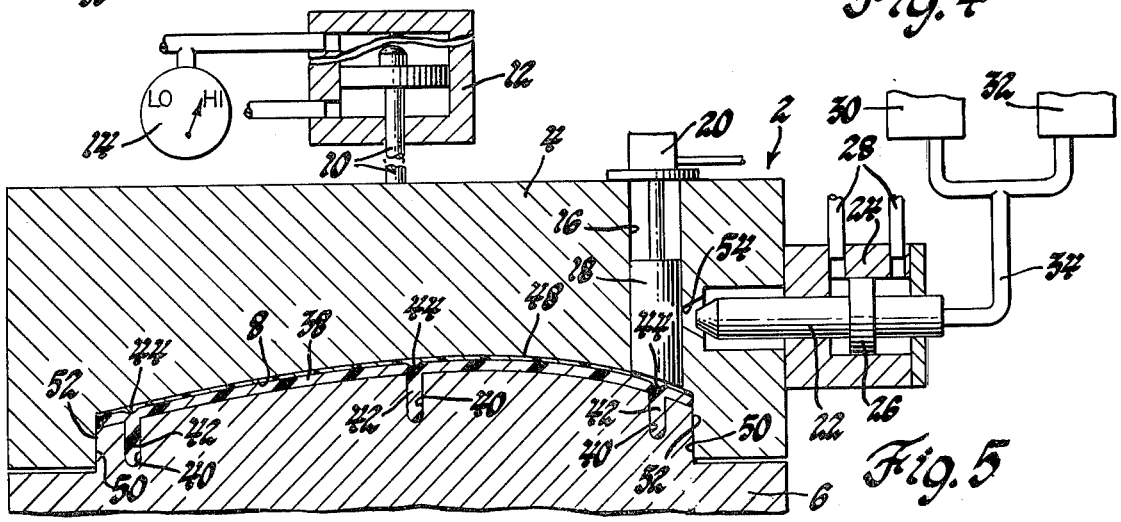
FIG. 5 is a sectioned side view of the mold of FIG. 1 illustrating the compression molding of the skin-forming material over the surface of the molded SMC.

As best illustrated in FIG. 4, the die halves 4 and 6 separate sufficiently to permit injection of the skin-forming resin 46 into the zone between the movable die 4 and the substrate 38 but not enough to unnest or upset the telescoping relation of the dies. As a result the zone above the substrate 38 into which the skin-forming resin 46 is injected remains substantially sealed against loss of the skin-forming resin 46 during injection and subsequent compression molding. Maintenance of this seal around the mold cavity further reduces the ingress of ambient air and/or contaminants into the mold cavity 8 during the partial opening thereof.

For purposes of the present invention the die 4 including the integral chamber 16 and piston 18, as well as the injector 22 are shown only schematically. Specific preferred devices for practicing the process of the present invention are disclosed and claimed in copending U.S. patent application Ser. No. 746,864 filed concurrently herewith in the names of M. Reichardt and L. Cerano and is assigned to the assignee of the present invention.

In accordance with one specific example, test panels were molded and coated in accordance with the present invention. The panels were 15 inches square (i.e., 15 in × 15 in), ⅛ inch thick and had a slight crown in the center. They were reinforced with a 3/16 inch thick peripheral flange and H-shaped ribbing across the panel, which flanges and ribs varied in height from ⅛ inch at their ends to ⅝ inch at the crowned center. The panels were compression molded from about 1,200 gs of a fiber-glass reinforced, low-shrink, Sheet Molding Compound (SMC) used by the General Tire and Rubber Co. in the molding of Chevrolet Corvette door panels and further identified as GT & R SMC molding formulation 7020 which generally comprises about:

| Ingredient | Parts |
|---|---|
| Paraplex P340 (Rohm & Haas) [A] | 4,000 |
| Paraplex P681 (Rohm & Haas) [B] | 2,240 |
| Paraplex P543 (Rohm & Haas) [C] | 772 |
| Calcium Carbonate Filler | 10,520 |
| Tertiary Butyl Perbenzoate | 70 |
| Zinc Stearate | 350 |
| Mg (OH)$_2$ | 316 |
| Glass Fibers | 7,830 |
| | 26,008 |

Notes:
[A] A 65% solution of polyester (i.e., essentially polypropylene fumerate) in styrene.
[B] A low-shrink additive containing some carboxyl groups and comprising a 35% solution of polymethyl methacrylate in styrene monomer.
[C] A low-shrink additive without any carboxyl groups comprising a 35% solution of polymethyl methacrylate in styrene monomer.

As is illustrated in FIG. 1, a ⅛ inch sheet of the SMC was placed between the separable dies of a compression mold preheated to about 300° F. The mold was closed and about 800 psi pressure applied to the SMC to effect its flow throughout the mold cavity (e.g., see FIG. 2). The SMC was allowed to cure for about 90 secs (i.e., about 90% cured).

The ram pressure on the movable die was then relaxed and about 30 grams of a skin-forming material injected against (i.e., substantially normal to) the upper surface of the substrate and into the region between the surface and the movable die as the die separates from the surface being coated by a distance or gap of about 0.010 inch. The skin-forming material is a two-component thermosetting material designed specifically for this purpose and contained both vinyl (i.e., polyester) and isocyanate reactivity adjusted to give a 90 sec cure time at 300° F to produce an isocyanate-based skin. This material and its use is described in a paper authored by Messrs. R. Griffith, H. Sharuski and W. Van Essen and presented at the 32nd Annual Conference (February 1977) of the Society of the Plastics Industry Inc.'s. Reinforced Plastics/Composites Institute, and is the subject of U.S. patent application Ser. No. 620,515, filed Oct. 8, 1975 in the names of Van Essen, Sharuski and Griffith and is assigned to the General Tire and Rubber Co. (see also equivalent German patent 24 42 227). This skin-forming material is a degassed mixture of an isocyanate terminated material having an excess (i.e., more moles NCO than reactive H atoms) of reactive isocyanate groups and a material which contains either reactive hydrogens (e.g., polyhydroxyl compounds) or a catalyst capable of trimerizing the terminal NCO groups. More specifically yet, the two-component skin-forming materials comprised:

| ISOCYANATE COMPONENT (ca. 5,000 cp) | |
|---|---|
| Ingredient | Parts |
| Isonate 143L [1] | 2,175 |
| General Tire 60/40 [2] | 1,305 |
| Tertiary Butyl Perbenzoate | 75 |
| Tertiary Butyl Peroctoate | 15 |

| POLYESTER COMPONENT (ca. 25,000–30,000 cp) | |
|---|---|
| Ingredient | Parts |
| Polyester [3] | 3,000 |
| Tetrol [4] | 850 |
| Georgia Talc | 1,670 |
| Zelec UN [5] | 5 |
| Blue Dye | 5 |
| Dibutyl Tin Dilaurate (10% in styrene) | 15 |

| -continued | |
|---|---|
| Benzoquinone (2% in styrene) | 30 |

Notes:
[1] A liquid provided by the Upjohn Co. and consisting essentially of diphenylmethane-4, 4' diisocyanate.
[2] Polypropylene butylene adipate (m.w. ca. 1,000).
[3] Unsaturated, hydroxy-terminated polypropylene fumerate (m.w. ca. 1,250) -70% in styrene.
[4] Wyandotte Chemical Co.'s propylene oxide adduct of pentaerythritol.
[5] A mold release agent provided by E. I. Dupont Co.

The respective components were each prepared in the general manner described in the aforesaid U.S. Ser. No. 620,515 and then mixed in a ratio of 2.34 parts polyester component to 1 part isocyanate component to yield an injectable reactive liquid having a cure time of about 90 secs at 300° C. The mix was injected with sufficient pressure to overcome the residual pressure on the ram and the weight of the movable parts to separate the movable die from the surface of the substrate being coated. At the completion of injection, the ram was repressurized and about 800 psi applied to the skin-forming material spreading it over the surface of the substrate and substantially filling/covering any imperfections thereon as the movable die closes to within about 0.004-0.005 inch from the surface. The die temperature and pressure is maintained for about 90 secs while the skin cures and the substrate completes its cure. The mold is then opened and the composite article ejected therefrom.

While the invention has been disclosed in terms of specific embodiments thereof, it is to be understood that other substrates, two-component, skin-forming materials and single-component, skin-forming materials can also be used with this invention and therefore the invention is limited not by the specific embodiments but rather only to the extent set forth in the claims which follow.

The embodiments of the invention in which an exclusive property or privilege is claimed are defined as follows:

1. A method of molding a composite polymeric article comprising a substrate and a special purpose skin of predetermined thickness on a surface of said substrate, said method comprising the steps of:
    molding said substrate between separable dies which coact in a first fully-closed position to define a mold cavity corresponding in size and shape to said substrate, and nest one within the other to provide a polymer containment seal around said cavity;
    allowing said substrate to harden in said cavity;
    separating one of said dies from said surface of said substrate to provide a first gap therebetween which is greater than said predetermined thickness of said skin but insufficient to unnest said dies;
    injecting a metered amount of skin-forming material into said gap in such a manner as to substantially hydraulically immobilize said substrate in said cavity during said separating, said amount being sufficient to provide said predetermined thickness but insufficient to fill said gap;
    applying molding pressure to said one die to reduce said one gap to a second gap which is commensurate with said predetermined thickness, and to distribute said injected material substantially uniformly throughout said second gap and over said surface;
    maintaining said pressure while said material bonds to said surface and solidifies sufficiently to permit complete separation of said dies without disruption of the skin thusly formed; and
    completely separating said dies and removing said composite from said cavity.

2. A method of molding a composite polymeric article comprising a substrate and a special purpose skin of predetermined thickness on a surface of said substrate, said method comprising the steps of:
    molding said substrate between separable dies which coact in a first fully-closed position to define a mold cavity corresponding in size and shape to said substrate, and nest one within the other to provide a polymer containment seal around said cavity;
    allowing said substrate to harden in said cavity;
    injecting a metered amount of skin-forming material between said surface of said substrate and the die which formed that surface in such a manner as to separate said surface-forming die from said surface by a first gap which is greater than said predetermined thickness of said skin but insufficient to unnest said dies and to substantially hydraulically immobilize said substrate in said cavity during said separating, said amount being sufficient to provide said predetermined thickness but insufficient to fill said first gap;
    applying molding pressure to said surface-forming die to reduce said one gap to a second gap which is commensurate with said predetermined thickness and to distribute said injected material substantially uniformly throughout said second gap and over said surface;
    maintaining said pressure while said material bonds to said surface and solidifies sufficiently to permit complete separation of said dies without disruption of the skin thusly formed; and
    completely separating said dies and removing said composite from said cavity.

* * * * *